United States Patent
Choi et al.

(10) Patent No.: US 10,654,347 B2
(45) Date of Patent: May 19, 2020

(54) HEMMING STRUCTURE FOR HYBRID-TYPE DOOR

(71) Applicants: Hyundai Motor Company, Seoul (KR); Kia Motors Corporation, Seoul (KR)

(72) Inventors: Ki Hyun Choi, Seoul (KR); Jai Hak Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/002,307

(22) Filed: Jun. 7, 2018

(65) Prior Publication Data
US 2019/0176599 A1    Jun. 13, 2019

(30) Foreign Application Priority Data

Dec. 13, 2017   (KR) .................... 10-2017-0170882

(51) Int. Cl.
| | |
|---|---|
| *E04C 1/00* | (2006.01) |
| *B60J 10/16* | (2016.01) |
| *B60J 5/04* | (2006.01) |
| *B60J 10/86* | (2016.01) |

(52) U.S. Cl.
CPC ........... *B60J 10/16* (2016.02); *B60J 5/0469* (2013.01); *B60J 5/0484* (2013.01); *B60J 10/86* (2016.02)

(58) Field of Classification Search
CPC ........... B60J 10/16; B60J 5/0484; B60J 10/86
USPC .................................................... 52/309.14
See application file for complete search history.

(56) References Cited

U.S. PATENT DOCUMENTS

| | | | |
|---|---|---|---|
| 3,909,918 A | 10/1975 | Takizawa et al. | |
| 3,909,919 A | 10/1975 | Miyabayashi et al. | |
| 5,237,734 A | 8/1993 | Polon | |
| 5,749,992 A | 5/1998 | Eklund et al. | |
| 6,523,244 B1 * | 2/2003 | Bissonnette | B21D 39/021 29/243.5 |
| 6,528,176 B1 | 3/2003 | Asai et al. | |
| 7,201,435 B2 * | 4/2007 | Losch | B62D 25/06 296/187.05 |

(Continued)

FOREIGN PATENT DOCUMENTS

| | | |
|---|---|---|
| JP | 2009178750 A | 8/2009 |
| KR | 20030005628 A | 1/2003 |

*Primary Examiner* — Basil S Katcheves
(74) *Attorney, Agent, or Firm* — Mintz Levin Cohn Ferris Glovsky and Popeo, P.C.; Peter F. Corless

(57) ABSTRACT

Disclosed is a structure for a hybrid-type door, which is capable of preventing deformation caused by difference in thermal expansion coefficient between an outer panel of aluminum alloy and an inner panel of iron steel. The structure for a hybrid-type door may include an inner panel and an outer panel made of different material from the inner panel. In particular, an end portion of the inner panel may be hemmed by an end portion of the outer panel with the end portions of the inner panel and the outer panel being brought into contact with each other. A sealer may be applied to a contact area at which the inner panel and the outer panel are brought into contact with each other, and the sealer may include a first sealer that may be curable at a room temperature, and a second sealer that may be curable at a temperature greater than a curing temperature of the first sealer.

11 Claims, 4 Drawing Sheets

(56) References Cited

U.S. PATENT DOCUMENTS

| | | | |
|---|---|---|---|
| 7,318,873 B2 * | 1/2008 | Czaplicki | B29C 70/70 |
| | | | 156/293 |
| 7,438,782 B2 * | 10/2008 | Sheasley | C09J 5/06 |
| | | | 156/293 |
| 7,770,778 B2 | 8/2010 | Hasegawa et al. | |
| 9,428,225 B2 * | 8/2016 | Minei | B62D 27/026 |
| 2004/0079478 A1 * | 4/2004 | Merz | B60R 13/06 |
| | | | 156/275.7 |
| 2005/0269027 A1 | 12/2005 | Ondrus et al. | |
| 2016/0200182 A1 | 7/2016 | Ogawa et al. | |
| 2016/0263971 A1 | 9/2016 | Haselwanter et al. | |
| 2016/0339966 A1 | 11/2016 | Iwase et al. | |
| 2017/0166039 A1 | 6/2017 | Torazza et al. | |
| 2017/0274742 A1 | 9/2017 | Lange | |
| 2018/0272849 A1 * | 9/2018 | Ratiu | B60J 10/16 |

* cited by examiner

HEMMING STRUCTURE FOR HYBRID-TYPE DOOR

CROSS REFERENCE TO RELATED APPLICATION

The present application claims priority to Korean Patent Application No. 10-2017-0170882, filed Dec. 13, 2017, the entire contents of which is incorporated herein for all purposes by this reference.

TECHNICAL FIELD

The present invention relates to a hemming structure for a hybrid-type door, which may prevent deformation caused by difference in thermal expansion coefficient between an outer panel of aluminum alloy steel and an inner panel of iron steel.

BACKGROUND OF THE INVENTION

Generally, a vehicle door has a structure including two or more panels connected to each other for weight reduction and rigidity maintenance.

For example, FIG. 1 shows sectional views of a hemming structure in the related art and a problem of a conventional door. As shown in FIG. 1, the hemming structure of the conventional door includes an inner panel 10 disposed at the inner side of a vehicle body, and an outer panel 20 disposed at the outer side of the vehicle body. At a junction area between the inner panel 10 and the outer panel 20, a flange 21 protruding more than the inner panel 10 by a predetermined length is disposed at an end of the outer panel 20, and a hemming structure is formed by being bent such that the flange 21 is brought into contact with an opposite surface of the inner panel 10 or a surface facing the interior of the vehicle.

Further, a sealer 30 is applied onto the junction area between the inner panel 10 and the outer panel 20 to prevent penetration of moisture and foreign matter. The sealer 30 has an elongation property of about 10% and an impact property of about 35 N/mm, and is cured at a temperature greater than room temperature, preferably at the atmospheric temperature range of the painting process. The sealer 30 is cured as it passes through an oven during the painting process and maintains the impact property while increasing the bonding force between the inner and outer panels.

Meanwhile, in recent years, in order to improve the physical properties of a door for weight reduction and rigidity maintenance, a hybrid-type door, in which the outer panel is made of aluminum alloy material and the inner panel is made of iron steel material, has been proposed and used.

In the related art, the door of the hybrid type may be manufactured by hemming process as shown in ① of FIG. 1, and then it may pass through an oven during the painting process. As shown in ② of FIG. 1, due to the difference in thermal expansion coefficient between the inner panel 10 of iron steel and the outer panel 20 of the aluminum alloy, the outer panel 20 of the aluminum alloy may be expanded greater than the inner panel 10 of the iron steel. Then, a sealer is cured as shown in ③ of FIG. 1 with the outer panel 20 expanded more than the inner panel 10. During the process of cooling after the painting process with the outer panel 20 and the inner panel 10 bonded together, the outer panel 20 of the aluminum alloy may contact greater than the inner panel 10 of steel as shown in ④ of FIG. 1, thereby causing distortion.

Meanwhile, if the elongation of the sealer used in the hybrid-type door is improved, distortion caused by the difference in thermal expansion coefficient between different materials may be prevented, but a sealer with high elongation may not be used because of its low rigidity and bonding performance.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, the present invention provides a structure for a door, which may prevent deformation caused by difference in thermal expansion coefficient between an outer panel of the aluminum alloy and an inner panel of the iron steel. In preferred embodiment, the door may have a hemming structure.

The term "hemming", "hem" or "hemmed" as used herein refers to a structure that is formed by folding a part near an edge of a first article to surround an edge of a second article, such that the edge part of the second article may be inserted inside into the folded part of the first article and the edge of the second article is not exposed to outside. For instance, the end portion of a first panel may be surrounded or hemmed by the end portion of a second panel.

In one aspect of the present invention provided is a structure for a hybrid-type door. The structure may include an inner panel and an outer panel made of different material from the inner panel. An end portion of the inner panel may be hemmed by an end portion of the outer panel with the end portion of the inner panel and the end portion of the outer panel being brought into contact with each other. Preferably, a sealer may be applied to a contact area at which the inner panel and the outer panel are brought into contact with each other. Preferably, the sealer may include a first sealer that is curable at a first curing temperature and a second sealer that is curable at a second curing temperature.

The "different material" or "different materials" as used herein refers to at least two or more of materials that have different compositions or components from the other material in an amount of about 10 wt % or greater, by about 20 wt % or greater, by about 30 wt % or greater, by about 40 wt % or greater, by about 50 wt % or greater, by about 60 wt % or greater, by about 70 wt % or greater, by about 80 wt % or greater, or by about 90 wt % or greater of the total weight of the material. For example, the different material from the other material may have different compositions, such that the properties such as density, thermoelectric coefficient, thermal expansion coefficient, thermal contraction coefficient, tensile strength or elongation may be different by about 5%, by about 10%, by about 20%, by about 30%, by about 40%, by about 50%, by about 60%, by about 70%, by about 80%, or by about 10% in the measurements.

The term "cure", "curing" or "curing process" as used herein refers a hardening process of a resin, a binder or a polymer, e.g., such hardening indicated by an increase of molecular weight such as by forming a cross-linked structure in the resin, the binder or the polymer and forming a plastic material. The curing may be performed by applying a light (e.g., UV light), heat, or electron beam, or adding chemical additives to the resin or the polymer.

Preferably, the first curing temperature and the second curing temperature may be different. Particularly, the second curing temperature may be greater than the first curing temperature.

The first curing temperature may range from about 0 to about 100° C., from about 5 to about 80° C., from about 10 to about 60° C., from about 15 to about 50° C., from about 15 to about 30° C., or from about 15 to about 25° C. The first curing temperature may suitably be room temperature (e.g., about 15-25° C.).

The second curing temperature may range from about 100 to about 300° C., from about 120 to about 280° C., from about 140 to about 260° C., from about 160 to about 240° C., from about 170 to about 220° C., or from about 180 to about 200° C. The second curing temperature may suitably be at a temperature range of about 180 to 200° C.

In certain embodiments, the first curing temperature and the second curing temperature are different at least by about 10° C., at least by about 20° C., at least by about 50° C., at least by about 70° C., at least by about 100° C., at least by about 150° C., at least by about 200° C., or at least by about 235° C. The second sealer may be cured at a temperature greater than the curing temperature of the first sealer.

The second sealer may be cured at a temperature range of about 180 to 200° C. The first sealer may be applied to for a first layer and the second sealer may be applied to form a second layer, the first layer and the second layer are adjacent to each other in a horizontal direction along the contact area with the inner panel and the outer panel being brought into contact with each other at the contact surface.

Alternatively, the first sealer may be applied to form a first layer and the second sealer may be applied to form a second layer, the first layer and the second layer are stacked in a vertical direction of the contact area with the inner panel and the outer panel being brought into contact with each other at the contact surface.

Moreover, the first sealer and the second sealer may be mixed and applied.

The first sealer may include at least two or more urethane resins, and the second sealer may include an epoxy resin.

The first sealer may have an elongation of about 60 to 80%, and the second sealer may have an elongation of about 5 to 20%.

The "elongation" as used herein refers to an expansion property of material. For example, when the object or material is under the stress or force applied just before its breakage or complete deformation, the change of the length or amount of extension varied under that stress or the force may be calculated as a percentage to the original length or the original state.

The inner panel may include a steel material, and the outer panel may include an aluminum alloy.

The term "aluminum alloy" as used herein refers to an alloy material that contains aluminum as dominant material, for example, greater than about 50 wt %, greater than about 55 wt %, greater than about 60 wt %, greater than about 65 wt %, greater than about 70 wt %, greater than about 75 wt %, greater than about 80 wt %, greater than about 85 wt %, greater than about 90 wt %, greater than about 95 wt %, greater than about 96 wt %, greater than about 97 wt %, greater than about 98 wt %, or greater than about 99 wt %, based on the total weight of the aluminum alloy.

The term "iron steel" as used herein refers to a steel that contains iron and carbon as major components of the steel composition such that the iron and carbons are alloyed for improving the physical properties of the steel. For instance, iron may be a dominant material in the iron steel, for example, greater than about 50 wt %, greater than about 55 wt %, greater than about 60 wt %, greater than about 65 wt %, greater than about 70 wt %, greater than about 75 wt %, greater than about 80 wt %, greater than about 85 wt %, greater than about 90 wt %, greater than about 95 wt %, greater than about 96 wt %, greater than about 97 wt %, greater than about 98 wt %, or greater than about 99 wt %, based on the total weight of the iron steel.

Further provided is a vehicle that may include the structure as described herein.

Accordingly, when the outer panel and the inner panel, which are made of different materials, are hemmed, since both a high temperature curing sealer with high elongation and a room temperature curing sealer with low elongation and high bonding force may be used, distortion caused by difference in thermal expansion coefficient between the different materials during the painting process may be suppressed.

Other aspects of the invention are disclosed infra.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
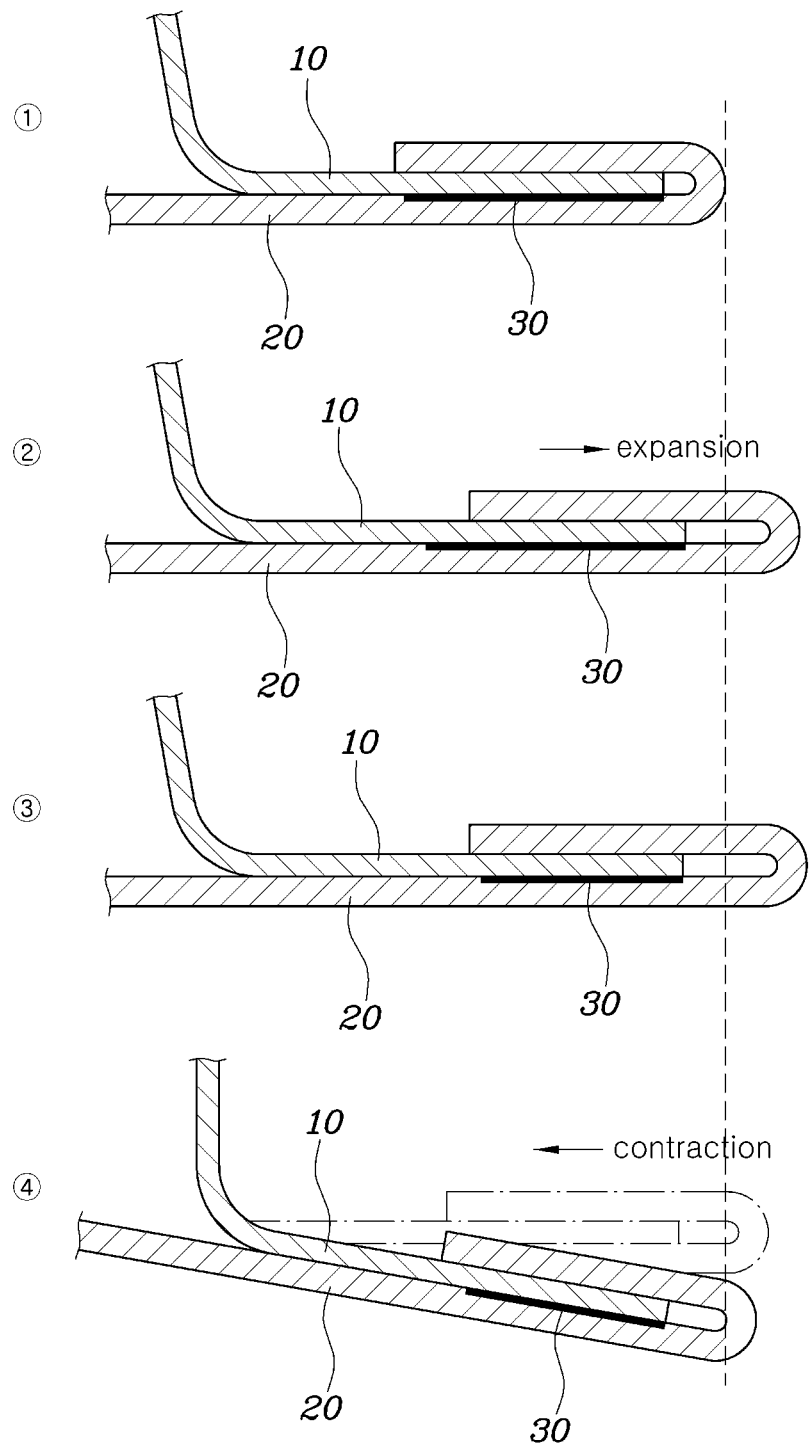
FIG. 1 shows sectional views of a hemming structure in the related art.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, various exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
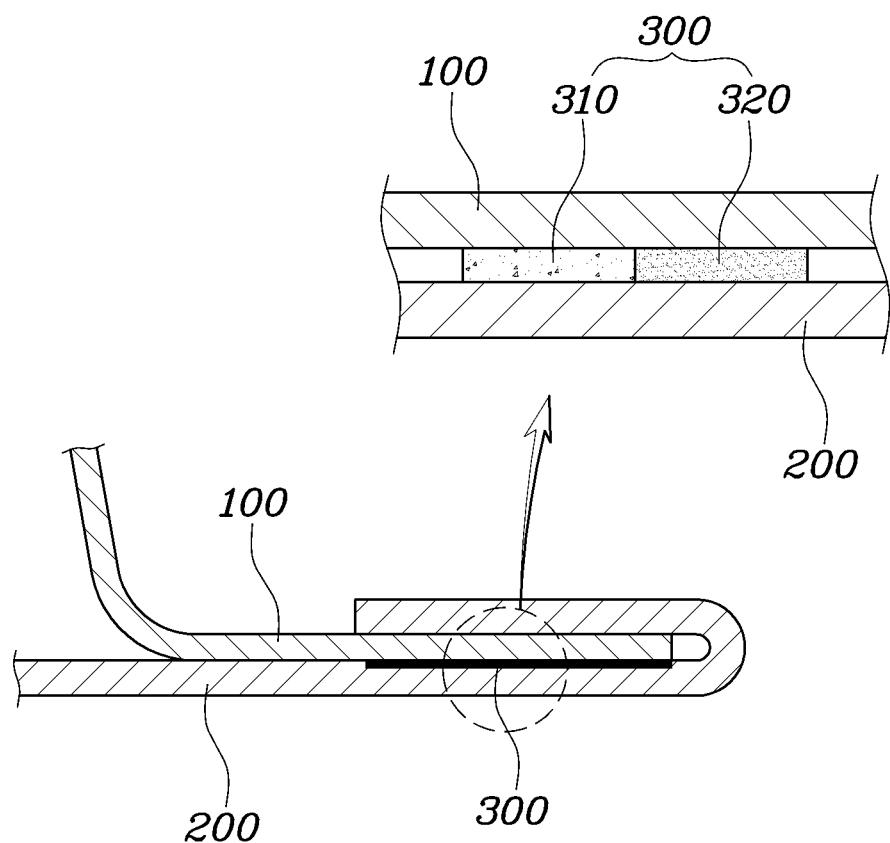
FIG. 2 shows an exemplary sectional view of an exemplary hemming structure for an exemplary hybrid-type door according to an exemplary embodiment of the present invention.

FIG. 2 shows a sectional view of an exemplary hemming structure for an exemplary hybrid-type door according to an exemplary embodiment of the present invention.

As shown in the drawing, a hemming structure for a hybrid-type door according to an exemplary embodiment of the present invention may include an inner panel 100 and an outer panel 200 made of different materials. For example, the inner panel 100 may be made of an iron steel material having a small thermal expansion coefficient and the outer panel 200 may be made of an aluminum alloy material having a high thermal expansion coefficient. Herein, the steel material may include an iron-based alloy, and the aluminum alloy may include an aluminum-based alloy.

The inner panel 100 and the outer panel 200 may be parts constituting a vehicle door, and the shapes thereof may be variously changed depending on the shape of the vehicle door.

Preferably, each of the inner panel 100 and the outer panel 200 may be provided with a contact area at which end portions thereof are brought into contact with each other. The end portions of the inner panel 100 and the outer panel 200 refer to edges of the inner panel 100 and the outer panel 200.

The inner panel 100 and the outer panel 200 may be brought into contact with each other at the end portions thereof. Here, the end portion of the outer panel 200 may extend longer than the end portion of the inner panel 100 to hem the end portion of the inner panel 100 by surrounding the same.

Preferably, a sealer 300 may be applied to areas, at which end portions of the inner panel 100 and the outer panel 200 may be brought into contact with each other, such that the bonding force therebetween may be improved and moisture and foreign matter from penetrating into the contact areas may be prevented.

Particularly, in order to prevent distortion during the painting process, the sealer 300 may include a first sealer 310 that may be curable at a room temperature, and a second sealer 320 that may be curable at a temperature different from the curing temperature of the first sealer (e.g., room temperature). Preferably, the curing temperature of the second sealer may be greater than the curing temperature of the first sealer 310.

The first sealer 310 may include at least two or more of urethane resins and the elongation thereof may be about 60 to 80%. Preferably, the contact areas, at which the inner panel 100 and the outer panel 200 are coupled to each other by hemming, may be kept bonded to each other by the first sealer 310 cured before painting process.

Accordingly, even if the inner panel 100 and the outer panel 200 with different thermal expansion coefficients are heated while passing through the oven during the painting process, the outer panel 200 of aluminum may be deformed by an expansion amount equal to that of the inner panel 100 of steel due to the bonding force therebetween.

Of course, the fact that the outer panel 200 may be deformed by the expansion amount of the inner panel 100 does not mean that the expansion amounts of the outer panel 200 and the inner panel 100 are exactly the same. Since the outer panel 200 including aluminum alloy and the inner panel 100 including iron steel have different thermal expansion coefficients, even if there is a difference in the expansion amount, the mutual bonding force by the first sealer 310 may be significantly reduce the difference in the expansion amount to a level at which distortion may be prevented.

Meanwhile, the second sealer 320 may include an epoxy type resin material, and the elongation thereof may be about 5 to 20%. Further, the second sealer 320 may be cured at a temperature different from the curing temperature of the first sealer, preferably greater than a curing temperature of the first sealer 310 to generate a bonding force. Here, the second sealer 320 may be cured at a temperature greater than the room temperature, preferably atmospheric temperature range of the painting process. For example, the second sealer 320 may be cured at a temperature range of about 180 to 200° C., which is the atmospheric temperature range of the painting process.

Thus, the inner panel 100 and the outer panel 200 with reduced difference in the expansion amount therebetween by being bonded to each other by the first sealer 310 during the painting process may have a further increased bonding force by curing of the second sealer 320. Preferably, after the painting process, the inner panel 100 and the outer panel 200 may be contracted while being cooled, and the outer panel 200 of aluminum may be deformed by the contraction amount of the inner panel 100 of steel due to the mutual bonding force by the first sealer 310 and the second sealer 320.

Of course, the fact that the outer panel 200 may be deformed by the contraction amount of the inner panel 100 does not mean that the contraction amounts of the outer panel 200 and the inner panel 100 are exactly the same. Since the outer panel 200 including aluminum alloy and the inner panel 100 including iron steel have different thermal expansion coefficients, even if there is a difference in the contraction amount, the mutual bonding force by the first sealer 310 and the second sealer 320 may significantly reduce the difference in the contraction amount to a level at which distortion is prevented.

Meanwhile, in the embodiment, the first sealer 310 and the second sealer 320 may be applied to be parallel with each other in a horizontal direction based on a contact surface at which the inner panel 100 and the outer panel 200 are brought into contact with each other. Thus, during or after hemming, and before the painting process from the hemming, by the first sealer 310, the inner panel 100 and the outer panel 200 may be kept bonded to each other in the area onto which the first sealer 310 is applied, and after the painting process, the inner panel 100 and the outer panel 200 may be kept bonded to each other in the area onto which the first sealer 310 and the second sealer 320 are applied.

Of course, the arrangement and the shape of the sealer 300 are not limited to the above embodiments and may be variously modified and implemented.

Figure 3A:
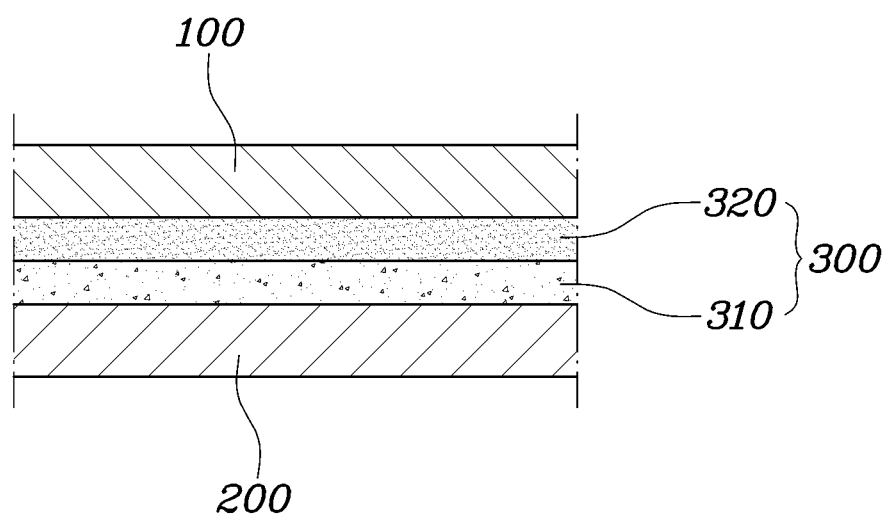
FIG. 3A shows an exemplary sectional views of an exemplary hemming structure for an exemplary hybrid-type door according to an exemplary embodiment of the present invention.
Figure 3B:
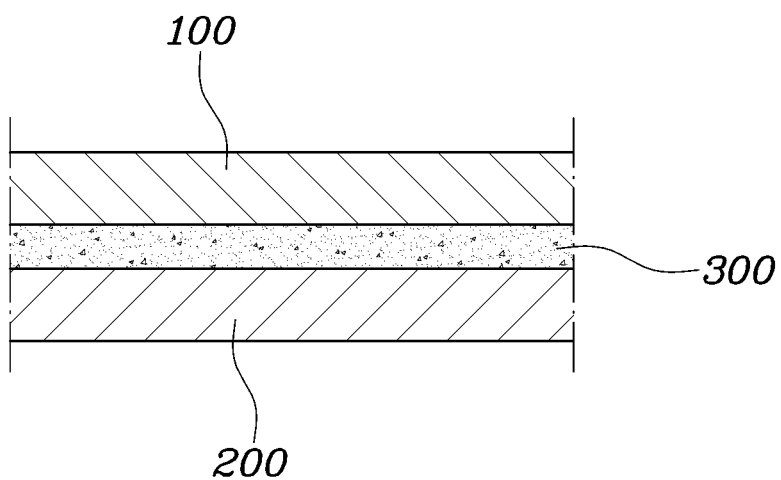
FIG. 3B shows an exemplary sectional views of an exemplary hemming structure for an exemplary hybrid-type door according to an exemplary embodiment of the present invention and FIG. 4 shows an exemplary view of an exemplary hemming method for an exemplary hybrid-type door according to an exemplary embodiment of the present invention.

FIGS. 3A and 3B show sectional views of exemplary hemming structures for a hybrid-type door according to exemplary embodiments of the present invention.

As shown in FIG. 3A, in the hemming structure for a hybrid-type door according to another embodiment of the present invention, the sealer 300 may be applied and the sealer may include a first sealer 310 forming a first layer and a second sealer 320 forming a second. The first layer and the second layer may be applied to be stacked in a vertical direction of the contact area or contact surface at which the inner panel 100 and the outer panel 200 may be brought into contact with each other. Preferably, the first sealer 310 may be applied to the outer panel 200 of aluminum alloy having a large thermal expansion coefficient. Thus, during or after hemming, and before the painting process from the hemming, by the first sealer 310, the inner panel 100 and the outer panel 200 may be kept bonded to each other, and the expansion of the inner panel 100 during the painting process may be suppressed by the first sealer 310. After the painting process, the inner panel 100 and the outer panel 200 may be kept bonded to each other by the first sealer 310 and the second sealer 320.

Further, as shown in FIG. 3B, in the hemming structure for a hybrid-type door according to another embodiment of the present invention, the sealer 300 may be applied in such a way that the first sealer and the second sealer may be mixed and applied. Thus, during or after hemming, and before the painting process from the hemming, by a component of the first sealer, the inner panel 100 and the outer panel 200 may be kept bonded to each other, and after the painting process, the inner panel 100 and the outer panel 200 may be kept bonded to each other by components of the first sealer and the second sealer.

A hemming method for the hybrid-type door configured as described above according to an embodiment of the present invention will be described with reference to the accompanying drawings.

Figure 4:
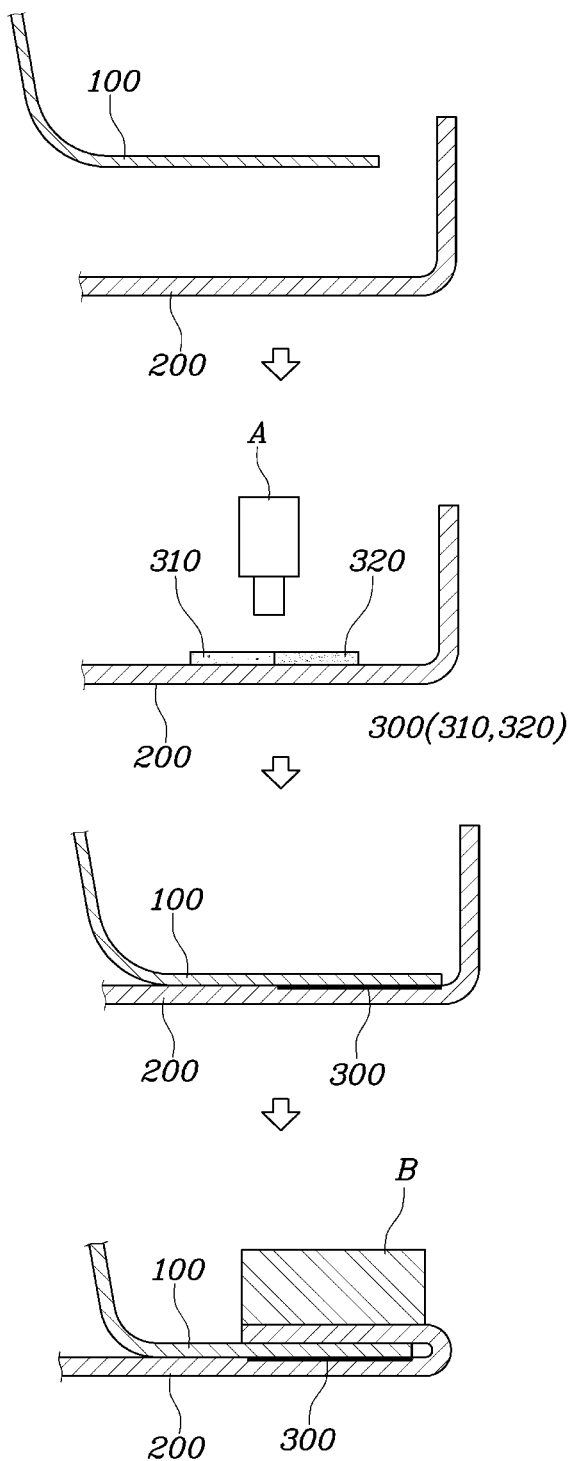

FIG. 4 shows a view of an exemplary hemming method for an exemplary hybrid-type door according to an exemplary embodiment of the present invention.

As shown in the drawing, when the inner panel 100 and the outer panel 200 for each shape are prepared, the sealer 300 may be applied onto the contact area of the outer panel 200 by using an application tool A. The applied sealer 300 may include the first sealer 310 and the second sealer 320. For instance, the first sealer 310 may form a first layer and the second sealer may form a second layer. The first layer and the second layer may be applied to be adjacent to each other parallel with each other in a horizontal direction along the contact area or the contact surface.

After applying the sealer 300, the inner panel 100 may be disposed on top of the outer panel 200 to be brought into contact with each other. The inner panel 100 and the outer panel 200 may be bonded to each other by the first sealer 310 cured at a room temperature.

When the inner panel 100 and the outer panel 200 are brought into contact with each other and bonded to each other by the first sealer 310, the end portion of the outer panel 200 is bent by using a hemming tool B to hem the end portion of the inner panel 100.

Meanwhile, the second sealer 320, which may be cured at high temperature, may remain uncured until the hemming is complete, and in the painting process after hemming, it may be further cured to increase the bonding force between the inner panel 100 and the outer panel 200.

Although various exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A structure for a door, comprising:
an inner panel; and
an outer panel made of different material from the inner panel,
wherein an end portion of the inner panel is hemmed by an end portion of the outer panel with the end portion of the inner panel and the end portion of the outer panel being brought into contact with each other,
wherein the inner panel and the outer panel are configured to be brought into contact with each other to form an inner contact area and an outer contact area, a sealer is applied to the inner contact area only among the inner contact area and the outer contact area, and corresponding portions of the inner panel and the outer panel at the outer contact area are directly in face to face contact with each other,
wherein the sealer comprises a first sealer that is curable at a first curing temperature and a second sealer that is curable at a second curing temperature, and
wherein the first sealer is applied to form a first layer and the second sealer are applied to form a second layer, and the first layer and the second layer are adjacent to each other in a horizontal direction along the inner contact area.

2. The structure of claim 1, wherein the first curing temperature and the second curing temperature are different.

3. The structure of claim 1, wherein the second curing temperature is greater than the first curing temperature.

4. The structure of claim 1, wherein the first curing temperature is room temperature.

5. The structure of claim 1, wherein the second curing temperature is at a temperature range of about 180 to 200° C.

6. The structure of claim 1, wherein the first sealer comprises two or more of urethane resins, and the second sealer comprises an epoxy resin.

7. The structure of claim 1, wherein the first sealer has an elongation of about 60 to 80%, and the second sealer has an elongation of about 5 to 20%.

8. The structure of claim 1, wherein the inner panel comprises an iron steel, and the outer panel comprises an aluminum alloy.

9. A vehicle comprising a structure of claim 1.

10. A structure for a door, comprising:
an inner panel; and
an outer panel made of different material from the inner panel,
wherein an end portion of the inner panel is hemmed by an end portion of the outer panel with the end portion of the inner panel and the end portion of the outer panel being brought into contact with each other,
wherein the inner panel and the outer panel are configured to be brought into contact with each other to form an inner contact area and an outer contact area, a sealer is applied to the inner contact area only among the inner contact area and the outer contact area, and corresponding portions of the inner panel and the outer panel at the outer contact area are directly in face to face contact with each other,
wherein the sealer comprises a first sealer that is curable at a first curing temperature and a second sealer that is curable at a second curing temperature,
wherein the first sealer is applied to form a first layer and the second sealer is applied to form a second layer, wherein the first layer and the second layer are stacked in a vertical direction of the inner contact area, and
wherein the first sealer comprises two or more of urethane resins, and the second sealer comprises an epoxy resin.

11. A structure for a door, comprising:
an inner panel; and
an outer panel made of different material from the inner panel,
wherein an end portion of the inner panel is hemmed by an end portion of the outer panel with the end portion of the inner panel and the end portion of the outer panel being brought into contact with each other,
wherein the inner panel and the outer panel are configured to be brought into contact with each other to form an inner contact area and an outer contact area, a sealer is applied to the inner contact area only among the inner contact area and the outer contact area, and corresponding portions of the inner panel and the outer panel at the outer contact area are directly in face to face contact with each other,
wherein the sealer comprises a first sealer that is curable at a first curing temperature and a second sealer that is curable at a second curing temperature,
wherein the first sealer and the second sealer are mixed and applied within the inner contact area, and
wherein the first sealer comprises two or more of urethane resins, and the second sealer comprises an epoxy resin.

* * * * *